United States Patent Office 3,410,633
Patented Nov. 12, 1968

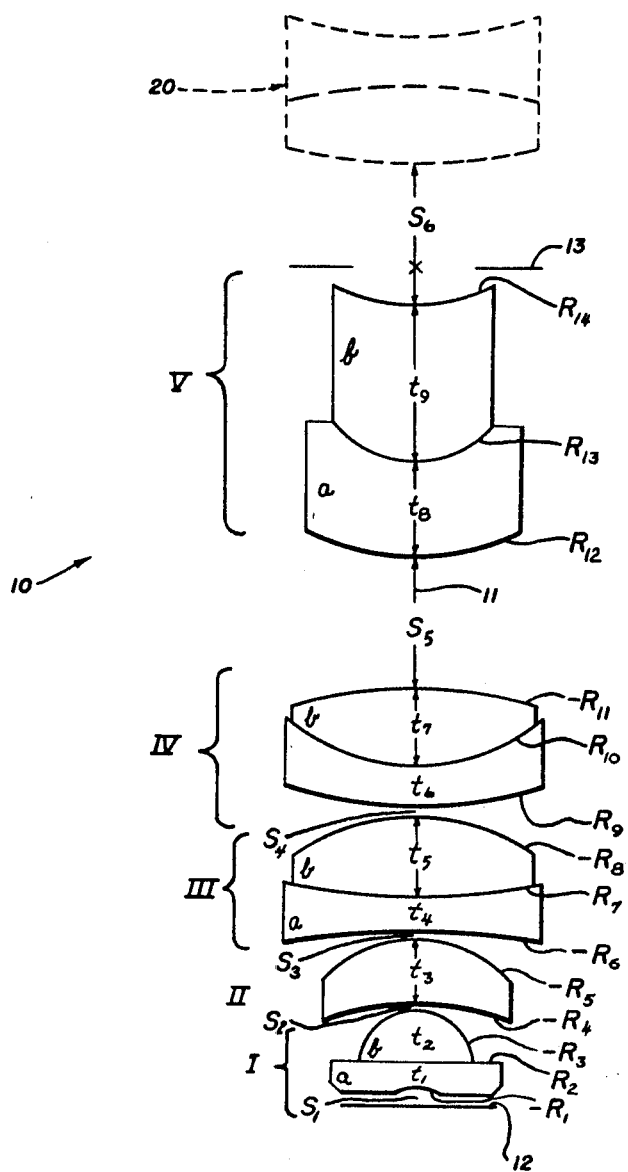

3,410,633
METALLURGICAL MICROSCOPE OBJECTIVE
Ralph B. Young, Henrietta, N.Y., assignor to Bausch & Lomb Incorporated, Rochester, N.Y., a corporation of New York
Filed Sept. 13, 1965, Ser. No. 486,898
2 Claims. (Cl. 350—215)

The present invention relates to an optical objective for use on metallographs and the like and more particularly it relates to improvements therein.

Optical objectives of the kind generally described herebelow have been disclosed in a copending application of Harold E. Rosenberger, Ser. No. 408,875, filed Nov. 4, 1964, and having the same assignee, wherein is described in particular a superior microscope objective for use with biological specimens which are usually diascopically illuminated by transmitted light. It has been discovered that when such a biological objective is used in metallurgical microscopes where the specimen is reflective and opaque, specular light reflected from the specimen is confused and degraded by the simultaneous ghost reflections caused by the vertical illuminator at the air-glass lens surfaces in the objective. Furthermore, anti-reflection coating when applied to said air-glass lens surfaces may reduce but does not eliminate the above-described difficulty.

In view of the foregoing statements, it is an object of the present invention to provide a microscope semi-objective of the kind described in the above-mentioned patent application having together with a 5× corrector lens substantially 80.0× overall magnification wherein ghost reflections from air-glass lens surfaces therein are either eliminated or are reduced to an innocuous condition.

It is a further object to provide such an objective having a very flat field and low distortion along with a superior degree of correction for astigmatism, coma and spherical image aberrations.

Further objects and advantages will be found in the arrangement and detailed structure of the parts of said objective by reference to the following specification and the accompanying drawing wherein the single figure is an optical diagram showing a preferred form of said invention.

The present microscope semi-objective per se is rated at 16.0× magnification and is designated in the drawing generally by the numeral 10. It is a member of a group of related metallographic semi-objectives having different magnification ratings which are interchangeably used in common with a single negative form corrector lens of 5× magnification as described in the aforementioned application of Rosenberger. Said corrector lens is designated by numeral 20 in the drawing and its magnification rating of 5×, when combined with the 16.0× magnification of the present semi-objective, produces a total magnification 80.0× for the entire objective, and corrects certain aberrations in the imaging properties of said semi-objective in the same manner as recited in cited patent application. Corrector lens 20 is located on the optical axis 11 of the semi-objective at a fixed distance $S_6$ rearwardly from the semi-objective 10.

According to the present invention, the form and arrangement of the lens members of said semi-objective 10 as well as the constructional details therefor are all so chosen that the aforesaid ghost reflections are reduced to an innocuous condition while coincidentally a good state of correction of image aberrations is achieved.

Comprised in said semi-objective 10 is a front compound lens member designated I which is located on an optical axis 11 at an axial distance designated $S_1$ rearwardly from an object or specimen surface 12. Lens member I is comprised of a front concavo-plano lens element designated Ia which is concave toward the object surface 12 and further comprises a rear plano-convex lens element Ib having its plano surface in contact with the plano surface of element Ia, the axial lens thicknesses of said front and rear elements being designated $t_1$ and $t_2$ respectively.

Aligned on axis 11 rearwardly of member I at an axial distance designated $S_2$ is a singlet positive meniscus lens member designated II which is concave toward the front and has an axial thickness designated $t_3$.

Spaced rearwardly of member II at an axial distance which is denoted $S_3$ is a second doublet lens member designated III. Member III comprises a front double concave lens element designated IIIa which lies in full contact on its rear surface with a rear double convex lens element designated IIIb, the axial thicknesses thereof being denoted $t_4$ and $t_5$ respectively.

Spaced still further rearwardly from lens member III at an axial distance $S_4$ is a third doublet lens member designated IV which comprises a front convex-concave lens element designated IVa which lies in complete contact on its rear surface with a double convex lens element designated IVb. The axial thicknesses of elements IVa and IVb are designated $t_6$ and $t_7$ respectively.

In rearmost position is a negative doublet meniscus-shaped lens member which is designated V and has its concave surface facing rearwardly. Member V comprises a front convex-concave lens element designated Va which joins a rear convex-concave lens element designated Vb along a mutual interface. Member V is spaced at an axial distance denoted $S_5$ from member IV and is spaced at the rear at a distance denoted $S_6$ from said corrector lens 20. The axial thicknesses of elements Va and Vb are designated $t_8$ and $t_9$ respectively.

A field diaphragm 13 is located rearwardly of lens member V at an axial distance of substantially .647F and has a free aperture of substantially 2.112F where F represents the combined equivalent focal length of the semi-objective 10 and the corrector lens 20.

The constructional data for the lens parameters which describe said semi-objective 10 are given in Table I herebelow, the values thereof being given in terms of F as above defined. Said parameters include the equivalent focal lengths of the successive lens members I to V which are designated respectively $-F_I$ to $-F_V$ and the equivalent focal lengths of the lens elements Ia to Vb which are designated $-F_{Ia}$ to $F_{Vb}$, and wherein the minus (—) sign signifies negative focal lengths. Further included in the table are the values for the successive lens surface radii of the lens members I to V which are designated $-R_1$ to $R_{14}$, the minus (—) sign used with certain designations meaning that the center of curvature of such surfaces lies on the object side of such surface, the values for the successive lens thicknesses $t_1$ to $t_9$ and air spaces $S_1$ to $S_6$ also being given. Additionally, the absolute values of the refractive indices $n_D(Ia)$ to $n_D(Vb)$ and Abbe numbers $\nu(Ia)$ to $\nu(Vb)$ are given in Table I, Table I $569.68F < -F_I < 617.16F$    $1.2217F < t_3 < 1.3503F$
$6.421F < F_{II} < 6.957F$    $.5764F < t_4 < .6370F$
$10.517F < F_{III} < 11.393F$    $1.4373F < t_5 < 1.5887F$
$14.400F < F_{IV} < 15.600F$    $.7685F < t_6 < .8495F$
$18.602F < -F_V < 20.152F$    $1.3300F < t_7 < 1.4700F$
$1.459F < -F_{Ia} < 1.581F$    $1.6986F < t_8 < 1.8774F$
$2.360F < F_{Ib} < 2.556F$    $2.8053F < t_9 < 3.1007F$
$10.517F < -F_{IIIa} < 11.393F$    $.2172F < S_1 < .2656F$
$5.653F < F_{IIIb} < 6.125F$    $.00445F < S_2 < .01656F$
$7.798F < -F_{IVa} < 8.448F$    $.15130F < S_3 < .19175F$
$5.114F < F_{IVb} < 5.540F$    $.18203F < S_4 < .22250F$
$6.359F < -F_{Va} < 6.889F$    $2.17720F < S_5 < 2.16610F$
$5.445F < F_{Vb} < 5.899F$    $2.36650F < S_6 < 2.89200F$
$.5111F < t_1 < .5649F$    $.8751F < -R_1 < .9109F$
$.8531F < t_2 < .9429F$ Table I—Continued $R_2$=Plano

| | |
|---|---|
| $1.2417F < -R_3 < 1.2923F$ | $1.6477 < n_D(Va) < 1.6543$ |
| $4.5707F < -R_4 < 4.7573F$ | $1.5110 < n_D(Vb) < 1.5170$ |
| $2.1207F < -R_5 < 2.2073F$ | $61.08 < \nu(Ia) < 61.32$ |
| $35.4025F < -R_6 < 36.8475F$ | $69.86 < \nu(Ib) < 70.14$ |
| $9.9578F < R_7 < 10.3642F$ | $8.0438F < -R_{11} < 8.3722F$ |
| $4.0043F < -R_8 < 4.1677F$ | $4.7961F < R_{12} < 4.9919F$ |
| $12.1422F < R_9 < 12.6378F$ | $1.9228F < R_{13} < 2.0012F$ |
| $3.7936F < R_{10} < 3.9484F$ | $2.8783F < R_{14} < 2.9957F$ |
| $1.5848 < n_D(Ia) < 1.5912$ | $69.86 < \nu(II) < 70.14$ |
| $1.5110 < n_D(Ib) < 1.5170$ | $29.24 < \nu(IIIa) < 29.36$ |
| $1.5110 < n_D(II) < 1.5170$ | $69.86 < \nu(IIIb) < 70.14$ |
| $1.7166 < n_D(IIIa) < 1.7234$ | $29.24 < \nu(IVa) < 29.36$ |
| $1.5110 < n_D(IIIb) < 1.5170$ | $69.86 < \nu(IVb) < 70.14$ |
| $1.7166 < n_D(IVa) < 1.7234$ | $58.28 < \nu(Va) < 58.52$ |
| $1.5110 < n_D(IVb) 1.5170$ | $69.86 < \nu(Vb) < 70.14$ |

More specifically, the values are substantially given in Table II herebelow with particular reference to one successful form of the invention, the symbolism used in the table being the same as Table I, Table II

| | |
|---|---|
| $-F_I = 593.42F$ | $t_9 = 2.953F$ |
| $F_{II} = 6.689F$ | $S_1 = .2410F$ |
| $F_{III} = 10.955F$ | $S_2 = .0101F$ |
| $F_{IV} = 15.000F$ | $S_3 = .1715F$ |
| $-F_V = 19.377F$ | $S_4 = .2022F$ |
| $-F_{Ia} = 1.520F$ | $S_5 = 2.4191F$ |
| $F_{Ib} = 2.458F$ | $S_6 = 2.6294F$ |
| $-F_{IIIa} = 10.950F$ | $-R_1 = .893F$ |
| $F_{IIIb} = 5.889F$ | $R_2$ = Plano |
| $-F_{IVa} = 8.123F$ | $-R_3 = 1.267F$ |
| $F_{IVb} = 5.327F$ | $-R_4 = 4.664F$ |
| $-F_{Va} = 6.624F$ | $-R_5 = 4.164F$ |
| $F_{Vb} = 5.672F$ | $-R_6 = 36.125F$ |
| $t_1 = .538F$ | $R_7 = 10.161F$ |
| $t_2 = .898F$ | $-R_8 = 4.086F$ |
| $t_3 = 1.286F$ | $R_9 = 12.390F$ |
| $t_4 = .6067F$ | $R_{10} = 3.871F$ |
| $t_5 = 1.513F$ | $-R_{11} = 8.208F$ |
| $t_6 = .809F$ | $R_{12} = 4.894F$ |
| $t_7 = 1.400F$ | $R_{13} = 1.962F$ |
| $t_8 = 1.788F$ | $R_{14} = 2.937F$ |

$n_D(Ia) = 1.588$
$n_D(Ib) = 1.514$
$n_D(II) = 1.514$
$n_D(IIIa) = 1.720$
$n_D(IIIb) = 1.514$
$n_D(IVa) = 1.720$
$n_D(IVb) = 1.514$
$n_D(Va) = 1.651$
$n_D(Vb) = 1.514$
$\nu(Ia) = 61.2$
$\nu(Ib) = 70.0$
$\nu(II) = 70.0$
$\nu(IIIa) = 29.3$
$\nu(IIIb) = 70.0$ } absolute values
$\nu(IVa) = 29.3$
$\nu(IVb) = 70.0$
$\nu(Va) = 58.4$
$\nu(Vb) = 70.0$ Although only one form of the present invention has been shown and described in detail, other modified forms of said semi-objective are possible and changes and substitutions may be made therein, particularly with regard to the values of the optical parameters within the tolerances specified without departing from the spirit of the invention as defined in the claims appended herebelow.

I claim:

1. A microscope semi-objective having a magnification per se of 16.0× and having together with an adjacent optically aligned negative corrector lens a rated magnification of 80.0× and a numerical aperture of substantially 0.85, the semi-objective and corrector lens together producing an image of excellent flatness which is well corrected for distortion and astigmatism as well as all other chromatic and monochromatic aberrations, the semi-objective being free of ghost reflections produced by the air glass lens surfaces when a vertical illuminator is used, said semi-objective comprising:

a front compound lens member designated I which is spaced at an axial distance $S_1$ rearwardly from an object surface and which includes a front concave-plano lens element designated Ia which lies in contact with a plano-convex lens rear element designated Ib along the plano surfaces, the axial thicknesses of said elements being designated $t_1$ and $t_2$ respectively, a singlet positive meniscus lens member designated II having a concave surface facing said object surface, said singlet being spaced at an axial distance designated $S_2$ rearwardly from member I and having an axial thickness denoted by $t_3$, a second doublet lens member designated III spaced at an axial distance $S_3$ rearwardly of member II and including a front double concave lens elements IIIa which lies in entire contact with a rear double convex lens elements IIIb, the respective axial thicknesses of said front and rear elements being $t_4$ and $t_5$ respectively, a third doublet lens member designated IV which is spaced at an axial distance designated $S_4$ rearwardly of member III, member IV including a front convex-concave lens member designated IVa which lies in contact along an interface with a rear double convex lens element designated IVb, the axial thicknesses of elements IVa and IVb being designated $t_6$ and $t_7$ respectively, and a rearmost doublet lens member designated V which is spaced at an axial distance denoted $S_5$ rearwardly from member IV and includes a front negative meniscus lens element designated Va which lies in contact along an interface with a rear positive meniscus lens element designated Vb which has a concave surface facing rearwardly, the axial thicknesses of elements Va and V being designated $t_8$ and $t_9$ respectively and the axial space between member V and the aforesaid rearward corrector lens being designated $S_6$, the specific values for the lens parameters which relate to the semi-objective per se being substantially given in the table herebelow wherein $-F_I$ to $-F_V$ and $-F_{Ia}$ to $F_{Vb}$ represent respectively the equivalent focal lengths of the aforementioned lens members and lens elements respectively, the minus (—) sign signifying negative focal lengths, said table including the aforesaid lens thicknesses $t_1$ to $t_9$ and air spaces $S_1$ to $S_6$, the aforesaid values being given in terms of F which represents the equivalent focal length of the semi-objective combined with said corrector lens, said table further including the specific absolute values substantially for the refractive indices designated $n_D(Ia)$ to $n_D(Vb)$ and Abbe numbers designated $\nu(Ia)$ to $\nu(Vb)$ of the glasses used in the aforesaid successive lens members and elements,

| | |
|---|---|
| $-F_I = 593.42F$ | $-F_{IIIa} = 10.950F$ |
| $F_{II} = 6.689F$ | $F_{IIIb} = 5.889F$ |
| $F_{III} = 10.955F$ | $-F_{IVa} = 8.123F$ |
| $F_{IV} = 15.000F$ | $F_{IVb} = 5.327F$ |
| $-F_V = 19.377F$ | $-F_{Va} = 6.624F$ |
| $-F_{Ia} = 1.520F$ | $F_{Vb} = 5.672F$ |
| $F_{Ib} = 2.458F$ | |
| $n_D(Ia) = 1.588$ | $n_D(IVa) = 1.720$ |
| $n_D(Ib) = 1.514$ | $n_D(IVb) = 1.514$ |
| $n_D(II) = 1.514$ | $n_D(Va) = 1.651$ |
| $n_D(IIIa) = 1.720$ | $n_D(Vb) = 1.514$ |
| $n_D(IIIb) = 1.514$ | |

$t_1 = .538F$
$t_2 = .898F$
$t_3 = 1.286F$
$t_4 = .6067F$
$t_5 = 1.513F$
$t_6 = .809F$
$t_7 = 1.400F$
$t_8 = 1.788F$ $t_9 = 2.953F$
$S_1 = .2410F$
$S_2 = .0101F$
$S_3 = .1715F$
$S_4 = .2022F$
$S_5 = 2.4191F$
$S_6 = 2.6294F$ $\nu(Ia) = 61.2$
$\nu(Ib) = 70.0$
$\nu(II) = 70.0$
$\nu(IIIa) = 29.3$
$\nu(IIIb) = 70.0$ $\nu(IVa) = 29.3$
$\nu(IVb) = 70.0$
$\nu(Va) = 58.4$
$\nu(IVb) = 70.0$

2. A microscope semi-objective having a magnification per se of 16.0× and having together with an adjacent optically aligned negative corrector lens a rated magnification of 80.0× and a numerical aperture of substantially 0.85, the semi-objective and corrector lens together producing an image of excellent flatness which is well corrected for distortion and astigmatism as well as all other chromatic and monochromatic aberrations, the semi-objective being free of ghost reflections produced by the air glass lens surfaces when a vertical illuminator is used, said semi-objective comprising:

a front compound lens member designated I which is spaced at an axial distance $S_1$ rearwardly from an object surface and which includes a front concave-plano lens element designated Ia which lies in contact with a plano-convex lens rear element designated Ib along the plano surfaces, the axial thicknesses of said elements being designated $t_1$ and $t_2$ respectively, a singlet positive meniscus lens member designated II having a concave surface facing said object surface, said singlet being spaced at an axial distance designated $S_2$ rearwardly from member I and having an axial thickness denoted by $t_3$, a second doublet lens member designated III spaced at an axial distance $S_3$ rearwardly of member II and including a front double concave lens element IIIa which lies in entire contact with a rear double convex lens element IIIb, the respective axial thicknesses of said front and rear elements being $t_4$ and $t_5$ respectively, a third doublet lens member designated IV which is spaced at an axial distance designated $S_4$ rearwardly of member III, member IV including a front convex-concave lens member designated IVa which lies in contact along an interface with a rear double convex lens element designated IVb, the axial thicknesses of elements IVa and IVb being designated $t_6$ and $t_7$ respectively, and a rearmost doublet lens member designated V which is spaced at an axial distance denoted $S_5$ rearwardly from member IV and includes a front negative meniscus lens element designated Va which lies in contact along an interface with a rear positive meniscus lens element designated Vb which has a concave surface facing rearwardly, the axial thicknesses of elements Va and Vb being designated $t_8$ and $t_9$ respectively and the axial space between member V and the aforesaid rearward corrector lens being designated $S_6$, the specific values for the lens parameters which relate to the semi-objective per se being substantially given in the table herebelow wherein $-R_1$ to $R_{14}$ represent the radii of curvature of the successive lens surfaces on the lens members I to V, the minus (—) sign used with certain R designations meaning that the centers of curvature of such surfaces lie on the object side thereof, the aforementioned lens thicknesses $t_1$ to $t_9$ and air spaces $S_1$ to $S_6$ being given in terms of F which designates the equivalent focal length of the semi-objective combined with said corrector lens, said table further including the specific absolute values substantially for the refractive indices designated $n_D(Ia)$ to $n_D(Vb)$ and Abbe numbers designated $\nu(Ia)$ to $\nu(Vb)$ of the glasses used in the aforesaid successive lens members and lens elements, $-R_1 = .893F$
$R_2 = \text{Plano}$
$-R_3 = 1.267F$
$-R_4 = 4.664F$
$-R_5 = 2.164F$
$-R_6 = 36.125F$
$R_7 = 10.161F$ $-R_8 = 4.086F$
$R_9 = 12.390F$
$R_{10} = 3.871F$
$-R_{11} = 8.208F$
$R_{12} = 4.894F$
$R_{13} = 1.962F$
$R_{14} = 2.937F$ $n_D(Ia) = 1.588$
$n_D(Ib) = 1.514$
$n_D(II) = 1.514$
$n_D(IIIa) = 1.720$
$n_D(IIIb) = 1.514$ $n_D(IVa) = 1.720$
$n_D(IVb) = 1.514$
$n_D(Va) = 1.651$
$n_D(Vb) = 1.514$ $t_1 = .538F$
$t_2 = .898F$
$t_3 = 1.286F$
$t_4 = .6067F$
$t_5 = 1.513F$
$t_6 = .809F$
$t_7 = 1.400F$
$t_8 = 1.788F$ $t_9 = 2.953F$
$S_1 = .2410F$
$S_2 = .0101F$
$S_3 = .1715F$
$S_4 = .2022F$
$S_5 = 2.4191F$
$S_6 = 2.6294F$ $\nu(Ia) = 61.2$
$\nu(Ib) = 70.0$
$\nu(II) = 70.0$
$\nu(IIIa) = 29.3$
$\nu(IIIb) = 70.0$ $\nu(IVa) = 29.3$
$\nu(IVb) = 70.0$
$\nu(Va) = 58.4$
$\nu(Vb) = 70.0$

References Cited

UNITED STATES PATENTS 3,118,964  1/1964  Buzawa.

FOREIGN PATENTS 1,186,234  1/1965  Germany.

DAVID SCHONBERG, *Primary Examiner.*

R. J. STERN, *Assistant Examiner.*

UNITED STATES PATENT OFFICE
CERTIFICATE OF CORRECTION

Patent No. 3,410,633                                                    November 12, 1968

Ralph B. Young

It is certified that error appears in the above identified patent and that said Letters Patent are hereby corrected as shown below:

Column 3, line 35, second column, "$-R_5 = 4.164\ F$" should read -- $-R_5 = 2.164\ F$ --.

Signed and sealed this 24th day of March 1970.

(SEAL)
Attest:

Edward M. Fletcher, Jr.                              WILLIAM E. SCHUYLER, JR.
Attesting Officer                                               Commissioner of Patents